UNITED STATES PATENT OFFICE.

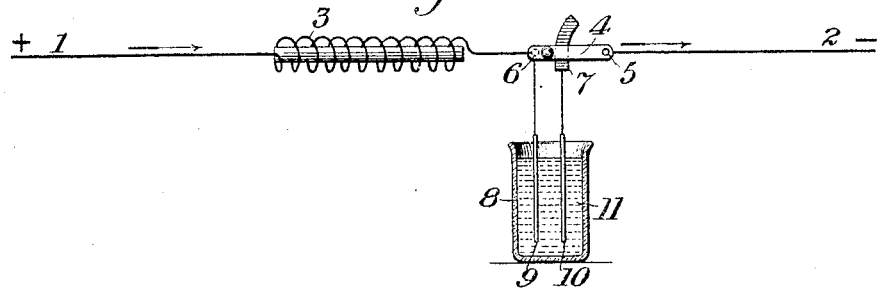
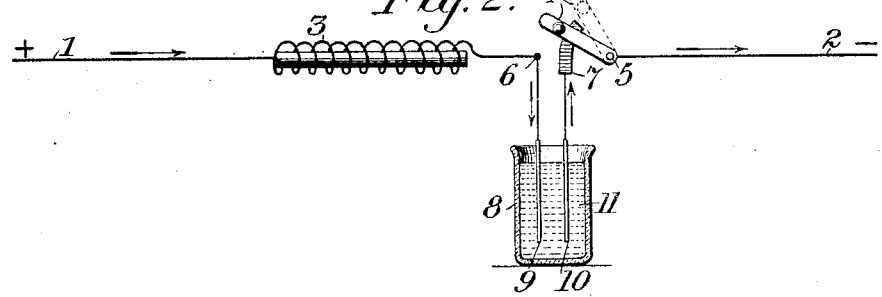
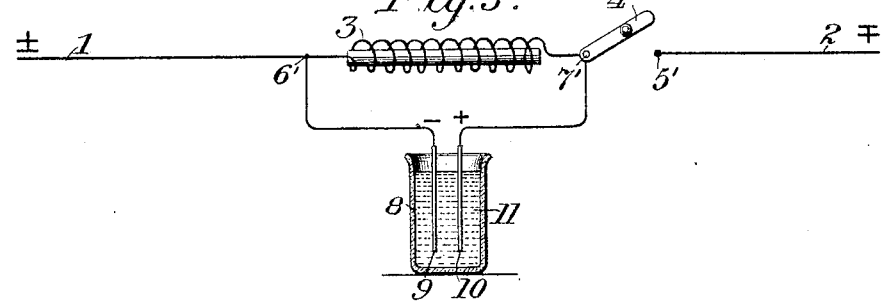
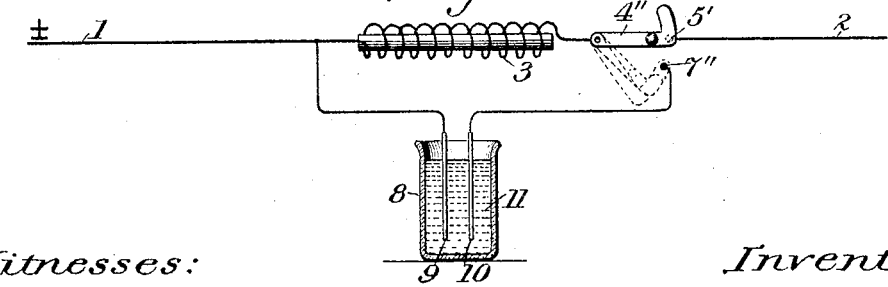

WILLIAM SMITH HORRY, OF NIAGARA FALLS, NEW YORK.

PROTECTIVE SHUNT FOR ELECTRIC CIRCUITS OF HIGH INDUCTANCE.

No. 808,371.  Specification of Letters Patent.  Patented Dec. 26, 1905.

Application filed January 26, 1905. Serial No. 242,799.

*To all whom it may concern:*

Be it known that I, WILLIAM SMITH HORRY, a citizen of the United States, residing at Niagara Falls, in the county of Niagara and State of New York, have invented certain new and useful Improvements in Protective Shunts for Electric Circuits of High Inductance, of which the following is a specification.

When an electric circuit containing an inductance is interrupted, the inductance generates an electromotive force in the same direction as the applied electromotive force. When the inductance and applied electromotive force are high, the secondary electromotive force, due to a sudden rupture of the circuit, may be so great as to form an arc at the break or endanger the insulation of the circuit. In order to furnish a path for the current due to such secondary electromotive force, it has been proposed to shunt either the circuit-breaker or inductance with a local circuit containing a secondary battery, a condenser, or a resistance. Each of these expedients has obvious disadvantages.

According to the present invention, either the circuit-breaker or inductance is provided with a protective shunt-circuit containing an electrolytic cell, the electrode which acts as an anode for the inductive discharge of the inductance consisting of a material which offers an abnormally high resistance to the flow of current therefrom. In the preferred cell such anode is of aluminium or an aluminium alloy. Both electrodes may consist of aluminium or an aluminium alloy, especially for circuits carrying an alternating current.

In the accompanying drawings, Figure 1 is a diagrammatic view of a main circuit containing an inductance and a switch and a switch shunt-circuit containing an electrolytic cell. Fig. 2 is a view of the same circuits with the switch shifted to open the main circuit. Fig. 3 is a view of a main circuit containing an inductance and a switch and an inductance shunt-circuit containing an electrolytic cell; and Fig. 4 is a view of the circuits shown in Fig. 3, with a modified form of switch.

In the figures the numerals 1 2 indicate a main circuit containing an inductance 3—for example, an electric motor or the field of an alternating-current generator. A switch 4 is arranged to control the main circuit. A shunt-circuit extends between points 6 7. The shunt-circuit contains an electrolytic cell 8, having electrodes 9 10, one or both of which may consist of aluminium or an equivalent aluminium alloy, and an electrolyte 11, which may be an aqueous solution of potassium phosphate or of citric or sulfuric acid.

In Fig. 1 the arrows indicate a direct current flowing from left to right through the inductance 3, the applied electromotive force being, for example, one hundred and ten volts. The switch 4 normally rests upon the main contact 6 and the shunt-contact 7. When the switch is moved to open the main circuit, it first leaves the contact 6, remaining upon the extended contact 7, as shown in Fig. 2. Both the applied electromotive force and that generated in the inductance by the interruption of the circuit now tend to force a current across the break. The combined electromotive forces also tend to force a current through the electrolytic cell 8 from the electrode 9 or anode to the electrode 10. The anode, consisting of aluminium or an aluminium alloy, has the well-known property of offering an abnormally high resistance to the flow of current therefrom to the electrolyte, this resistance being sufficient to substantially prevent the flow of current under an applied electromotive force of one hundred and ten volts. The high electromotive force resulting from the action of the inductance temporarily breaks down the resisting property of the aluminium, and the current is thereby shunted around the switch-break and through the cell. The potential difference at the terminals of the cell immediately falls to normal, and the anode resumes the condition in which it tends to obstruct and prevent further flow of current. The cell thus acts as an automatic safety-valve for high voltages, the excess voltage generated in the inductance forcing a current through the cell, which automatically resumes its original condition when the voltage falls to its normal value.

In the modified arrangement shown in Fig. 3 the shunt-circuit containing the electrolytic cell extends between points 6' 7' at each side of the inductance 3. The switch 4' when moved off the contact 5' simultaneously opens both the main and shunt circuits. The secondary electromotive force generated in the inductance by the interruption of the circuit forces a current through the cell, as heretofore described, temporarily breaking down its resistance. In this figure the main circuit is assumed to be carrying an alternating current. Both electrodes 9 10 should consist of aluminium or an aluminium alloy, since either may act as anode, depending on the direction of the current-wave when the circuit is opened.

Fig. 4 shows main and inductance shunt-circuits, which are provided with a switch 4″ having an arc-shaped contact end of sufficient length to bridge the main contact 5′ and the shunt-contact 7″. When the switch is in its normal position, (indicated by full lines,) the main circuit is closed and the shunt-circuit is open. When the switch is thrown into the position indicated by dotted lines, it first passes onto the contact 7″, closing the shunt-circuit, and then off the contact 5′, opening the main circuit. It is desirable to use this modified switch when the inductance 3 must remain in circuit for considerable periods, since the cell is normally out of circuit and there is no loss of current by slow or accidental leakage through it.

I claim—

1. In combination, a main circuit containing an inductance and a switch, and a shunt-circuit containing an electrolytic cell which resists the normal working pressure but yields to the induced pressure when the switch is opened, as set forth.

2. In combination, a main circuit containing an inductance and a switch, and a shunt-circuit containing an electrolytic cell, said cell having an aluminium anode for the inductive discharge, which resists the normal working pressure but yields to the induced pressure when the switch is opened, as set forth.

3. In combination, a main circuit containing an inductance and a switch, and a shunt-circuit containing an electrolytic cell, said cell having aluminium electrodes, which resist the normal working pressure but respectively yield to the induced pressure when the switch is opened, as set forth.

4. In combination, a main circuit containing an inductance and a switch, and a switch shunt-circuit containing an electrolytic cell which resists the normal working pressure but yields to the induced pressure when the switch is opened, as set forth.

5. In combination, a main circuit containing an inductance and a switch, and a switch shunt-circuit containing an electrolytic cell, said cell having an aluminium anode for the inductive discharge, which resists the normal working pressure but yields to the induced pressure when the switch is opened, as set forth.

6. In combination, a main circuit containing an inductance and a switch, and a switch shunt-circuit containing an electrolytic cell, said cell having aluminium electrodes, which resist the normal working pressure but respectively yield to the induced pressure when the switch is opened, as set forth.

In testimony whereof I affix my signature in presence of two witnesses.

WILLIAM SMITH HORRY.

Witnesses:
    EUGENE A. BYRNES,
    CLINTON P. TOWNSEND.